RECEIVER SYSTEM INCLUDING SPURIOUS SIGNAL DETECTOR

Filed Sept. 29, 1966 3 Sheets-Sheet 1

INVENTORS
DAVID M. BALL
RICHARD I. DISMAN

BY John F Lawler
ATTORNEY

RECEIVER SYSTEM INCLUDING SPURIOUS SIGNAL DETECTOR

Filed Sept. 29, 1966 3 Sheets-Sheet 2

INVENTORS
DAVID M. BALL
RICHARD I. DISMAN
BY John F. Lawler
ATTORNEY

INVENTORS
DAVID M. BALL
RICHARD I. DISMAN
BY John F. Lawler
ATTORNEY

United States Patent Office
3,396,395
Patented Aug. 6, 1968

3,396,395

RECEIVER SYSTEM INCLUDING SPURIOUS SIGNAL DETECTOR

David M. Ball, deceased, late of Mountain View, Calif., by Regina A. Ball, administratrix, Mountain View, Calif., and Richard I. Disman, Sunnyvale, Calif., assignors to Sylvania Electric Products Inc., a corporation of Delaware

Filed Sept. 29, 1966, Ser. No. 583,021
12 Claims. (Cl. 343—113)

ABSTRACT OF THE DISCLOSURE

In a sum and difference monopulse direction finding system, a received signal and a predetermined portion (10 db down) thereof are mixed with a local oscillator (LO) signal in respective mixers. The intermediate frequency (IF) signals from the mixers are applied to a comparator. If the ratio of the magnitudes of the mixer outputs is 10 db, the comparator output indicates that the IF signals are produced by a desired received signal. If this ratio is substantially greater than 10 db, the comparator output indicates that the mixer outputs are spurious IF signals produced by an undesired received signal.

This invention relates to superheterodyne receivers and more particularly to a system for distinguishing intermediate frequency signals produced by undesired and desired received signals.

"Desired" signals passing into a superheterodyne receiver are combined with a local oscillator (LO) signal in a mixer to generate in the mixer output a component at the fundamental frequency which component is called the intermediate frequency (IF) signal. (A "desired" received signal is defined as a signal which has a frequency $f_S$ that combines in a mixer with an LO signal which has a frequency $f_{LO}$ different from $f_S$ such that the fundamental frequency, i.e., $f_{LO}-f_S$, in the mixer output is equal to the intermediate frequency $f_{IF}$.) Since a mixer is a nonlinear device, however, the mixer output contains components at the fundamental frequency and harmonics as well. While an IF amplifier passes only IF signals, a spurious IF signal is produced if a harmonic of an undesired received signal combines with a corresponding harmonic of the fundamental LO signal in the mixer. (An "undesired" received signal is defined as a signal a harmonic of which when mixed with a corresponding harmonic of the LO output produces a signal at the intermediate frequency in the mixer output.) By way of example, a receiver system having an intermediate frequency $f_{IF}$ of 100 mHz. and an LO frequency $f_{LO}$ of 500 mHz. is responsive to desired received signals which have a frequency $f_S$ of 400 mHz.; i.e., $f_{IF}=f_{LO}-f_S=500$ mHz.–400 mHz.=100 mHz. If the frequency $f_S'$ of an undesired received signal is 450 mHz., however, the second harmonic ($2f_S'=2\times450$ mHz.=900 mHz.) of that signal may combine in the mixer with the second harmonic ($2f_{LO}=2\times500$ mHz.=1000 mHz.) of the LO signal to produce in the mixer output an IF signal having the same frequency $f_{IF}$ of 100 mHz.; i.e., $f_{IF}=2f_{LO}-2f_S'=1000$ mHz–900 mHz.=100 mHz. Components of the mixer output which have a frequency that is equal to the intermediate frequency $f_{IF}$ but which are produced by undesired received signals are called spurious signals.

It is desirable and sometimes essential that there be discrimination between IF signals caused by desired and undesired received signals. A prior art technique for eliminating such spurious signals is preselection filtering prior to the mixer. Mechanically tunable preselector filters are generally rather large and are not capable of rapid tuning purposes.

An object of this invention is the provision of a system for detecting spurious signals in the output of a mixer.

Another object is the provision of a system for detecting spurious signals in the output of the mixer of a superheterodyne receiver and rendering the receiver unresponsive thereto.

Another object is the provision of a direction finding system which is unresponsive to spurious signals in the output of the mixer.

Briefly, these and other objects are accomplished in accordance with this invention by combining an LO signal with a received signal in a first mixer and with a coupled portion of the received signal in a second mixer to produce IF signals. If the ratio of the magnitudes of the IF signals in the mixer outputs is equal to the coupling factor (i.e., degree of coupling), the IF signals are produced by a desired received signal. If the ratio between the IF signals in the mixer outputs is much greater than the coupling factor, however, the IF signals are produced by an undesired received signal.

More specifically, in a dual channel amplitude monopulse direction finding (DF) system, the sum signal from a pair of antennas is combined with an LO signal in a first mixer. The difference signal from the antennas is blocked from and the sum signal is coupled to a second mixer which combines the sum and LO signals. If signals in the mixer outputs are amplified by a pair of log IF amplifiers. A comparator responsive to the detected outputs of the amplifiers produces an output proportional to the ratio of the IF signals. The magnitudes of the components in the mixer outputs at the fundamental frequency are directly proportional to the magnitudes of the associated mixer inputs. The magnitudes of harmonics in the mixer outputs, however, are proportional to the magnitudes of the associated mixer inputs raised to the power of the associated harmonics, e.g., the magnitude of the second harmonic is proportional to the square of the associated mixer inputs. Thus, if the comparator output is substantially equal to the coupling factor, the IF signals correspond to the components in the mixer outputs at the fundamental frequency and are produced by a desired received signal. If the comparator output is substantially greater than the coupling factor, however, the IF signals correspond to harmonics in the mixer output and are produced by an undesired received signal.

This invention and these and other objects thereof will be more fully understood from the following description of a preferred embodiment thereof together with the accompanying drawings in which.

Figure 1:
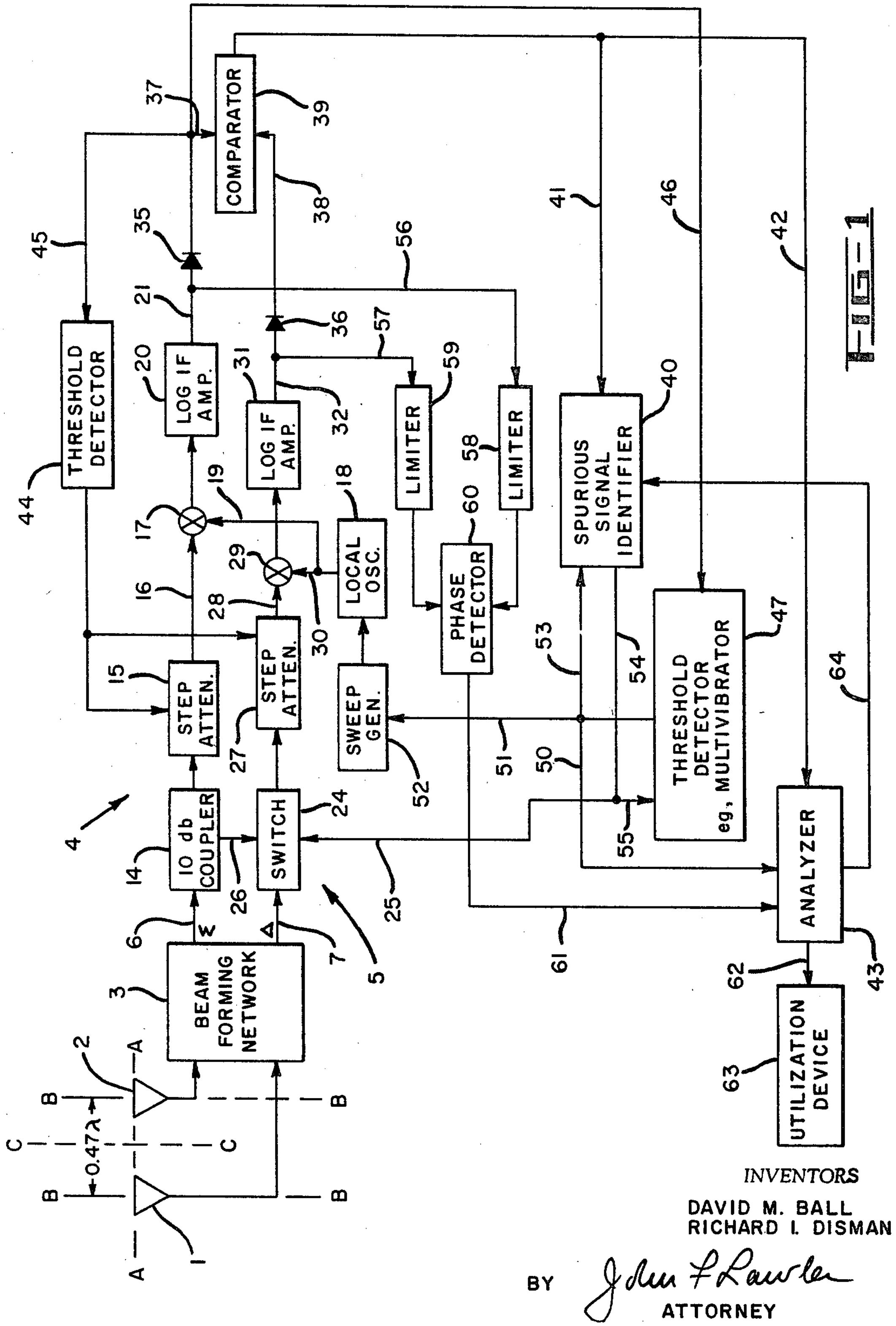
FIGURE 1 is a block diagram of a dual channel amplitude monopulse direction finding system embodying the invention.
Figure 2:
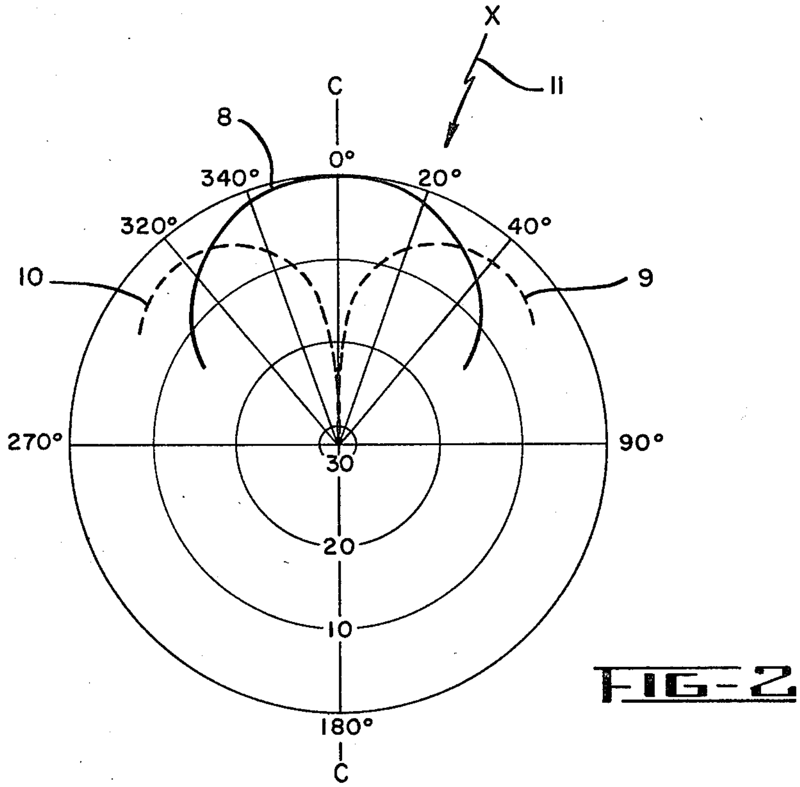
FIGURE 2 is a polar plot of azimuth sum and difference antenna patterns of the system of FIGURE 1.

Referring now to FIGURE 1, the amplitude monopulse dual channel DF system comprises receiving antennas 1 and 2, a beam-forming network 3, and first and second RF channels 4 and 5, respectively. Antennas 1 and 2 are positioned such that the apertures of the antennas are coincident with plane A—A. The longitudinal axes B—B of the antennas are preferably spaced apart and are parallel to the boresight axis C—C of the array. The curves in FIGURE 2 represent azimuth patterns of the antenna array when the longitudinal axes B—B are separated by approximately 0.45 of a wavelength at the middle of the operating band.

Beam-forming network 3 interconnects the outputs of the antennas, to provide on lines 6 and 7 outputs which are proportional to the sum ($\Sigma$) and difference ($\Delta$), respectively, of signals received by the antennas. Curve 8, see FIGURE 2, represents the azimuth pattern of the antenna array (with respect to its phase center which is at the intersection of the bore site axis C—C and the plane A—A, see FIGURE 1) when the antennas are connected to provide an output which is the sum of the signals received thereby. Curves 9 and 10 represent the patterns of the antenna array when the antennas are connected to provide an output proportional to the difference between signals received thereby. Signals represented by curves 9 and 10 are 180° out-of-phase with each other. Thus, signals represented by curve 8 will be in-phase with signals represented by either curve 9 or curve 10. As described more fully hereinafter, this phase information is employed to indicate sense of received signals, i.e., to indicate whether the source X of a received signal 11 is to the right or left of boresight (axis C—C and angle 0°) as viewed in FIGURE 2.

The sum signal on line 6 is coupled through a 10 db directional coupler 14, step attenuator 15, and line 16 to the first input to a mixer 17. The output of swept local oscillator 18 is applied on line 19 as the second input to mixer 17. Log IF amplifier 20 is responsive to IF signals in the output of mixer 17 for producing an amplified signal on line 21 which is proportional to the logarithm of the IF signal.

The second RF channel 5 is substantially identical to the first RF channel except that the former utilizes a switch 24 instead of a coupler 14. Switch 24 is responsive to a control signal on line 25 for connecting port 26 of coupler 14 through step attenuator 27 to the first input of a mixer 29. The output of beam-forming network 3 on line 7 is blocked from mixer 29 when the signal on line 6 is coupled through port 26 and line 28 to mixer 29.

The amplified IF signals on lines 21 and 32, see FIGURE 1, are detected by associated detectors 35 and 36 and are applied on lines 37 and 38, respectively, to comparator 39. The output of comparator 39 on line 41 is applied to spurious signal identifier 40 for determining whether a received signal is a desired signal or an undesired signal. The output of comparator 39 is also applied on line 42 to analyzer 43.

Threshold detector 44 is responsive to the output of detector 35 on line 45. Detector 44 is a dual threshold device that controls the attenuation of step attenuators 15 and 27. When the detected output of amplifier 20 exceeds an upper threshold, detector 44 biases attenuators 15 and 27 to increase the attenuation provided thereby to prevent signals on lines 16 and 28 from saturating the associated mixers 17 and 29. Detector 44 biases the attenuators to reduce the attenuation provided thereby when the detected output of amplifier 20 falls below a lower threshold.

The output of detector 35 is also applied on line 46 to threshold device 47 which may by way of example comprise a monostable multivibrator. The output of threshold device 47 is a control signal that is applied on line 50 to analyzer 43, on line 51 to the sweep generator 52, and on line 53 to the spurious signal identifier. The output of identifier 40 is a control signal on lines 54 and 25 which controls the operation of switch 24. The output of identifier 40 is also applied on line 55 to threshold device 47.

The outputs of amplifiers 20 and 31 on lines 56 and

57, respectively, are coupled through associated limiters 58 and 59 to phase detector 60. The limiters control the maximum amplitudes of the associated amplifier outputs in order to make detector 60 insensitive to the level of the amplifier outputs. The output of detector 60 is applied on line 61 to analyzer 43.

A first output of the analyzer is applied on line 62 to uitlization device 63 which may, by way of example, be an oscilloscope for presenting a graphic representation of information related to the received signal. A second output of the analyzer is applied on line 64 to control the operation of the spurious signal identifier.

Figure 4:
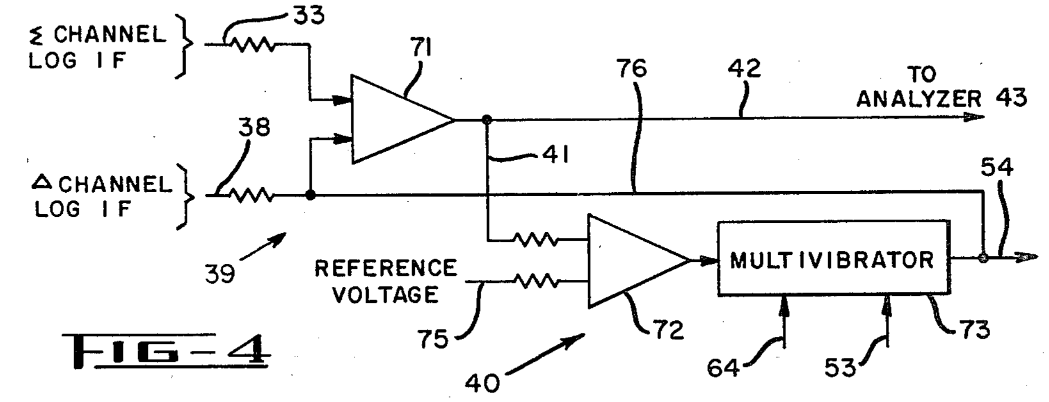
FIGURE 4 is a schematic block diagram of a portion of the system including the spurious signal identifier of FIGURE 1.

Referring now to FIGURE 4, comparator 39 has a first difference amplifier 71, and spurious signal identifier 40 includes a second differential amplifier 72 and a multivibrator 73. Multivibrator 73 may, by way of example, be a bistable multivibrator. The second input to differential amplifier 72 is connected on line 75 to a reference voltage source which relates the comparator output to a predetermined reference. When the comparator comprises a dual input differential amplifier 71, the output of multivibrator 73 is applied on line 76 to the difference channel input of amplifier 71 to provide automatic correction of gain imbalance between the two channels.

Figure 5:
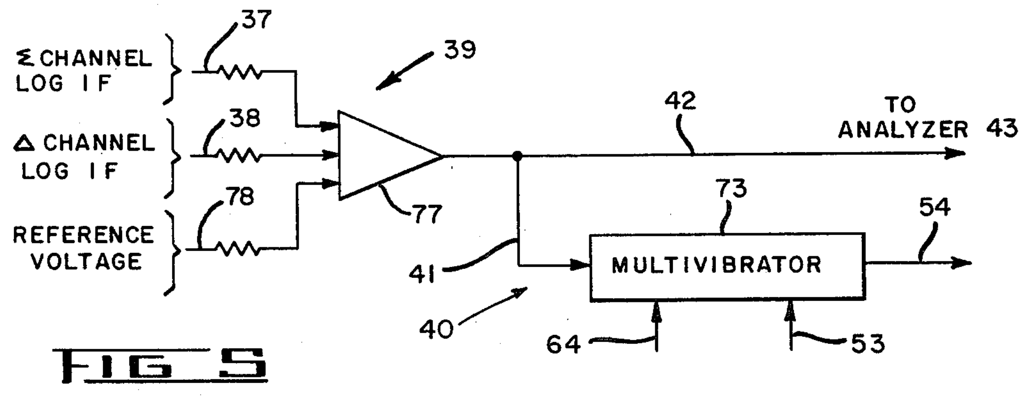
FIGURE 5 is a modified form of the embodiment of FIGURE 4.

Alternatively, comparator 39 may comprise a third differential amplifier 77, see FIGURE 5, which has a third input connected on line 78 to the reference voltage. In this embodiment, the output of differential amplifier 77 on line 41 is applied directly to multivibrator 73.

The system of FIGURE 1 has three different modes of operation, a search mode, a spurious signal identification mode and a direction finding mode. When the system is operating in the search mode and no incident signals are received by the antennas, attenuators 15 and 27 are initially biased by detector 44 to provide minimum attenuation of received signals. Multivibrator 47 is responsive to the output of detector 35 on line 46 for operating in a first state. The output of multivibrator 47 biases sweep generator 52 to cause the local oscillator to sweep over a predetermined band of frequencies. Identifier 40 is responsive to the output of multivibrator 47 for operating in a first state such that this multivibrator 73 is insensitive to the output of comparator 39 on line 41 and produces a control signal which biases switch 24 to connect port 26 of coupler 14 to mixer 29. The output of multivibrator 47 also biases analyzer 43 such that the latter is unresponsive to the output of comparator 39 on line 42.

Signals received by the antennas are combined by beam-forming network 3 to provide a sum signal on line 6 which is applied to mixer 17 and which is coupled 10 db down to mixer 29. The applied and coupled sum signals are combined in the mixers with the swept local oscillator signals. Since mixers 17 and 29 are nonlinear devices, the mixer output voltages $e_O$ thereof are comprised of signal components having frequencies that are the sum and difference of the frequencies of the input and local oscillator signals and harmonics thereof and are representable as $$ae_{LO}e_S \sin 2\pi(f_{LO}+f_S)t+be_{LO}^2e_S^2 \sin 2\pi(2f_{LO}+2f_S)t +ce_{LO}^3e_S^3 \sin 2\pi(3f_{LO}+3f_S)t+ \dots \quad (1)$$

where $e_{LO}$ is the local oscillator signal voltage, $e_S$ is the input signal voltage, $f_{LO}$ is the local oscillator signal frequency, $f_S$ is the input signal frequency, $t$ is time, and $a$, $b$, $c$ and $\pi$ are constants. The first term is Equation 1 is the component at the fundamental frequency, and the second and third terms are the second and third harmonics, respectively. It is possible for the fundamental frequency or the frequency of one of the harmonics to be equal to the intermediae frequency.

If the frequency of any of the components comprising the mixer outputs is equal to the intermediate frequency, those signal components are amplified and passed by the log IF amplifiers. The outputs of detectors 35 and 36 are processed by comparator 39 which produces an output that is proportional to the ratio of the IF signals in channels 4 and 5, and is applied to spurious signal identifier 40 and the analyzer 43. The receipt of a signal by the antennas is indicated when the magnitude of the output of detector 35 on line 46 exceeds a predetermined level and multivibrator 47 is, accordingly, biased to operate in a second state. It remains to determine whether the IF signal is caused by a desired or an undesired received signal.

The output voltage of either mixer 17 or 29 at the fundamental frequency is directly proportional to the input signal voltage $e_S$ and the LO voltage $e_{LO}$ and is represented by the first term in Equation 1. The mixer output voltage is proportional to the square, cube, etc., of the input signal $e_S$ and the LO signal voltage $e_{LO}$, however, for the second, third, etc., harmonics, respectively (the second and third terms, etc., in Equation 1). This relationship is utilized in this invention to discriminate between an IF signal produced by a desired receved signal and an IF signal produced by an undesired received signal.

Figure 6:
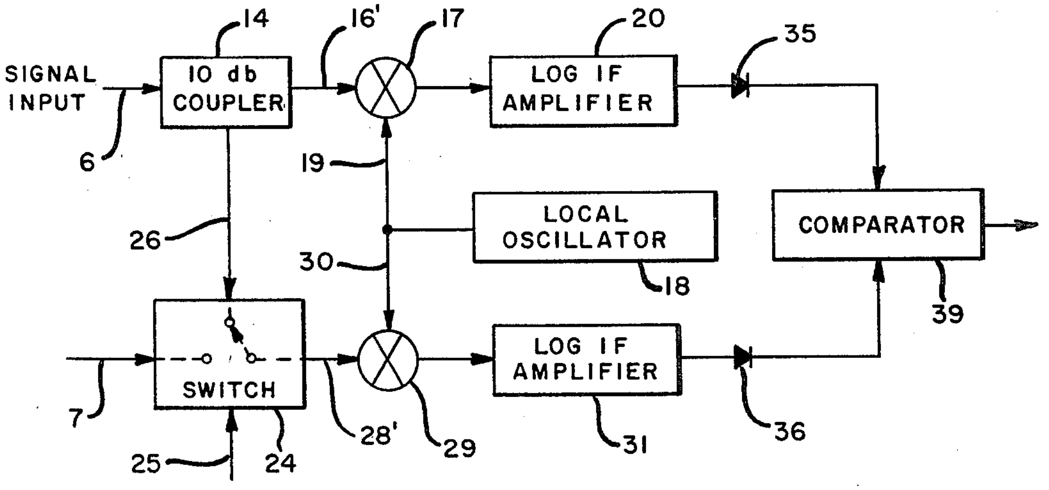
FIGURE 6 is a simplified schematic block diagram of a part of the system of FIGURE 1.

Referring now to the simplified block diagram of FIGURE 6, consider that the control signal on line 25 biases switch 24 to connect coupled port 26 of coupler 14 to mixer 29 and that an input signal from the antennas is applied on line 6. A signal voltage $e_{S1}$ is applied on line 16' to mixer 17 and is coupled 10 db down to mixer 29. Thus, the coupled input signal voltage on line 28' is 0.316 $e_{S1}$. The output voltages of mixers 17 and 29 are representable as $$ae_{LO}e_{S1}\sin 2\pi(f_{LO}+f_{S1})t +be_{LO}^2e_{S1}^2\sin 2\pi(2f_{LO}+2f_{S1})t +ce_{LO}^3e_{S1}^3\sin 2\pi(3f_{LO}+3f_{S1})t+\ldots \quad (2)$$

and $$ae_{LO}(0.316\ e_{S1})\sin 2\pi(f_{LO}+f_{S1})t +be_{LO}^2(0.316\ e_{S1})^2\sin 2\pi(2f_{LO}+2f_{S1})t +ce_{LO}^3(0.316\ e_{S1})^3\sin 2\pi(3f_{LO}+3f_{S1})t\ \ldots \quad (3)$$

respectively.

If the input signal frequency $f_{S1}$ is such that the difference frequency ($f_{LO}-f_{S1}$) in the mixer output is equal to the intermediate frequency, the outputs of amplifiers 20 and 31 are $$K_1 \log [ae_{LO}e_{S1}\sin 2\pi(f_{LO}-f_{S1})t] \quad (4)$$

and $$K_2 \log [ae_{LO}(0.316\ e_{S1})\sin 2\pi(f_{LO}-f_{S1})t] \quad (5)$$

respectively, where $K=K_1=K_2$ are constants which indicate that amplifiers 20 and 31 are matched. Since comparator 39 comprises a difference amplifier, the comparator output is proportional to the difference between Equations 5 and 4 and is also proportional to the ratio of IF signals and is representable as $$K \log \left[\frac{ae_{LO}(0.316\ e_{S1})\sin 2\pi(f_{LO}-f_{S1})t}{ae_{LO}e_{S1}\sin 2\pi(f_{LO}-f_{S1})t}\right]= \quad (6)$$

$$K \log (0.316)= \quad (7)$$

$$10K \text{ db.} \quad (8)$$

Equation 8 shows that when the difference frequency resulting from a desired received signal is equal to the intermediate frequency, the ratio of the voltages applied to comparator 39 is proportional to 10 db, which is the voltage coupling factor of coupler 14. It will be noted that this ratio is also proportional to the product of the exponent (one) of the signal voltage in the component of the mixer output having the fundamental frequency multiplied by the voltage coupling factor (10 db) of coupler 14.

If the frequence $f_{S1}$ of the input signal is such that the difference frequency resulting from mixing the second harmonic of the input signal with the second harmonic of the local oscillator is equal to the intermediate frequency, i.e., $f_{IF}=2f_{LO}-2f_{S1}$, the outputs of amplifiers 20 and 31 are $$K_1 \log [be_{LO}^2e_{S1}^2\sin 2\pi(2f_{LO}-2f_{S1})t] \quad (9)$$

and $$K_2 \log [be_{LO}^2(0.316\ e_{S1})^2\sin 2\pi(2f_{LO}-2f_{S1})t] \quad (10)$$

respectively. The output fo comparator 39 is then proportional to the difference between Equations 10 and 9 and is representable as $$K \log \left[\frac{be_{LO}^2(0.316\ e_{S1})^2\sin 2\pi(2f_{LO}-2f_{S1})t}{be_{LO}^2e_{S1}^2\sin 2\pi(2f_{LO}-2f_{S1})t}\right]= \quad (11)$$

$$K \log (0.316)^2= \quad (12)$$

$$20K \text{ db} \quad (13)$$

Equation 13 shows that when the difference frequency produced by the second harmonic of the local oscillator and the second harmonic of the input signal is equal to the intermediate frequency, the ratio of the input voltages to comparator 39 is proportional to 20 db. This ratio is also proportional to the product of the exponent (two) of that input signal voltage forming a part of the second harmoinc in the mixer output and the voltage coupling factor (10 db) of coupler 14. Similarly, the output of the differential amplifier will be proportional to 30 db, 40 db, etc., when the IF signal is produced by the third, fourth, etc. harmonics, respectively, of the mixed signals. The magnitude of the output of the comparator is employed in this invention to determine whether the IF signal is caused by a desired or undesired received signal.

Again referring to FIGURE 1, when multivibrator 47 operates in the second state the system operates in the spurious signal identification mode and the output thereof biases sweep generator 52 to cause the local oscillator to stop sweeping. Simultaneously, the signal on line 53 which biased identifier 40 to operate in the first state is removed therefrom to render it responsive to the output of the comparator.

If the comparator output is 20K db or greater, identifier 40 is biased by the comparator output to continue to operate in the first state and the received signal is determined to be a spurious signal. After a predetermined time, multivibrator 47 switches to again operate in the first state and the output thereof biases the sweep generator to cause the local oscillator to again sweep over the band of operating frequencies and biases identifier 40 to continue to operate in the first state and to be unresponsive to the output of the comparator.

If the comparator output is 10K db, however, identifier 40 is biased by the comparator output to operate in the second state to indicate that the received signal is a desired signal. The output of identifier 40 biases multivibrator 47 to continue to operate in the second state and biases switch 24 to connect the difference output of the beam-forming network on line 7 to mixer 29. The output of multivibrator 47 on line 50 is a control signal which actuates analyzer 43 when the multivbrator 47 operates in the second state. When the control signal remains on line 50 for a predetermined time, the system operates in the DF mode and the analyzer is caused to analyze the received signal.

As stated previously, curve 8 (see FIGURE 2) represents the patterns of the antennas when they are connected to provide an output which is the sum of signals received thereby. The information contained in the signal on line 6, and thus the amplified IF signal on line 21, therefore corresponds to the information contained in the sum signal antenna pattern 8. Curves 9 and 10, however, represent the patterns of the antenna array when the antennas are connected to provide an output which is the difference between signals received thereby. The information contained in the signal on line 7, and thus the amplified IF signal on line 32, therefore corresponds to information contained in the difference signal antenna patterns of curves 9 and 10. Since signals represented by curves 9 and 10 are 180° out-of-phase, the signals of curve 8 will be in-phase, by way of example, with the signals of curve 9.

Consider that the amplified IF signal on line 21 in the sum channel 4 is representable as $$e_{sum} \cos \omega t \quad (14)$$

where $\omega=2\pi f$. The amplified IF signal on line 32 in the difference channel 5 is therefore representable as $$e_{diff} \cos \omega t \quad (15)$$

or $$-e_{diff} \cos \omega t= \quad (16)$$

$$e_{diff} \cos \omega(t+\pi) \quad (17)$$

depending on whether the source of received signal is to the right or left, respectively, of the boresight axis C—C as viewed in FIGURE 2. The IF signal on line 32 which is caused by the received signal 11 is represented by Equation 15.

Phase detector 60 monitors the IF signals on lines 21 and 32. If the IF signals are out-of-phase, detector 60 produces a first output on line 61 which indicates that the source X of received signals 11 is to the left of boresight. Conversely, if the IF signals are in-phase, the phase detector produces a second output on line 61 which indicates that the source X of received signals 11 is to the right of boresight.

Figure 3:
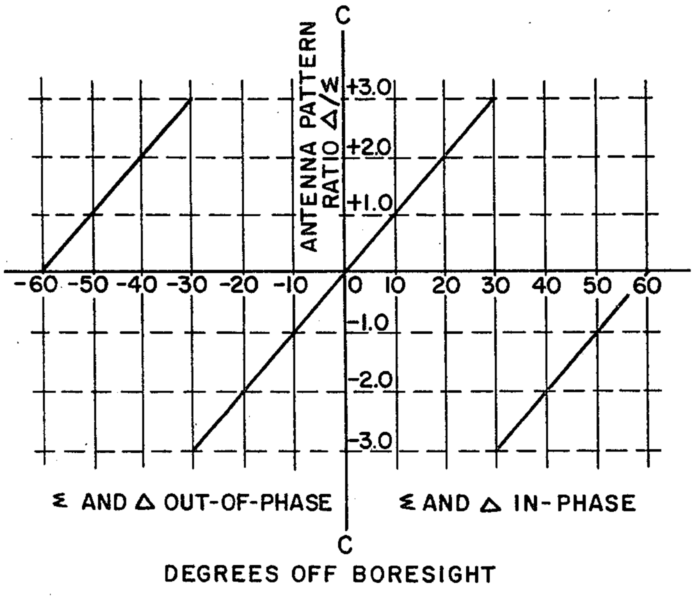
FIGURE 3 is a graphic representation of the bearing or degrees off boresight of the source of received signals as a function of the ratio $\Delta/\Sigma$ of the difference ($\Delta$) and sum ($\Sigma$) of the outputs of the antennas of FIGURE 1.

The output of comparator 39, which is the ratio of the difference signal in channel 5 to the sum signal in channel 4, is plotted in FIGURE 3 as a function of degrees off boresight of a received signal. In the example noted above, i.e., the received signal 11, the output of the phase detector on line 61 biases the analyzer to indicate that the source X of the received signal 11 is to the right of boresight. The analyzer is responsive to the magnitude and sence of the comparator output which indicates the actual angle between the boresight axis C—C and the source X of the received signal 11. Utilization device 63 may, by way of example, be a plan position indicator (PPI) scope for presenting a pictorial display of the direciton of the source X of the received signal 11.

After the received signal is processed by the analyzer and displayed by the utilization device, an output of the analyzer on line 64 causes identifier 40 to reset and again operate in the first state. Alternatively, identifier 40 may automatically change operating states after operating in the first state for a predetermined time. Operation of identifier 40 in the first state causes switch 24 to again connect port 26 of coupler 14 to mixer 29 and causes reset of multivibrator 47. Operation of multivibrator 47 in the first state causes the sweep generator 52 to bias the local oscillator to sweep across the band of operating frequencies, and biases identifier 40 and analyzer 43 to be unresponsive to the output of the comparator.

In practice, the detectors 35 and 36 which drive comparator 39 require a certain signal to noise ratio $S+N/N$, where S is the signal voltage and N is the noise voltage, for reliable triggering. If one of the detectors 35 and 36 does not trigger, the comparator output is the output of the triggered detector±the noise of the other detector. The actual $S+N/N$ required for reliable triggering of detectors 35 and 36 is determined empirically to be approximately 8 db. A 10 db+8 db=18 db effective signal to noise ratio is therefore required to facilitate triggering of detectors 35 and 36. This 18 db signal level is also the threshold which must be exceeded for triggering of multivibrators 47 and 73. Thus, if the comparator output is $<$18 db, a decision is made that the IF signals are not spurious but are derived from a desired received signal. If the comparator output is $\geq$18 db, however, the IF signals are considered spurious and produced by an undesired received signal.

Although this invention is described in relation to a specific embodiment thereof, the scope of the invention is defined in the following claims rather than the above-detailed description.

What is claimed is:

1. A receiver system adapted to receive an input signal comprising:

means for coupling part of the input signal to a first output and another part of the input signal to a second output, the signals at said first and second outputs being related by the coupling factor of said coupling means, a local oscillator having an output, a first mixer having a first input connected to the first output of said coupling means and having a second input connected to the output of said local oscillator and having an output, a second mixer having a first input and having a second input connected to the output of said local oscillator and having an output, first connecting means connecting the first input of said second mixer to the second output of said coupling means, said mixers producing signal outputs each having a fundamental component and harmonics thereof, means responsive to the mixer output signals which have a frequency equal to a prescribed intermediate frequency for producing an output signal proportional to the ratio of said mixer outputs, and first indicating means responsive to the signal output of said ratio producing means for indicating that components in the mixer signal outputs having a frequency equal to the intermediate frequency are caused by a desired received signal in the input signal when the signal output of said ratio producing means corresponds to a voltage ratio equal to the coupling factor of said coupling means and indicating that the components of the mixer signal outputs having frequencies equal to the intermediate frequency are caused by an undesired received signal in the input signal when the signal output of said ratio producing means corresponds to a voltage ratio equal to or greater than twice the coupling factor of said coupling means.

2. The receiver according to claim 1 including:

a sweep generator producing a sweep signal, said local oscillator being responsive to the sweep signal from said generator for producing a local oscillator signal which has a frequency that varies according to the sweep signal, said ratio means comprising:

first and second logarithmic amplifiers each responsive to the component in the signal outputs of said first and second mixers, respectively, which have a frequency equal to the intermediate frequency for producing an output signal which is the logarithm thereof, first and second detectors responsive to the signal outputs of said first and second amplifiers, respectively, for producing output signals proportional to the magnitudes thereof, and a comparator responsive to the signal outputs of said detectors for producing an output signal which is proportional to the ratio thereof.

3. The receiver according to claim 2 including second indicating means responsive to the signal output of said first detector for indicating whether a received signal is present in the input signal.

4. The system according to claim 3 wherein said second indicating means operates in a first state when a received signal is not present in the input signal and in a second state for indicating that a received signal is present in the input signal when the magnitude of the input signal is greater than the coupling factor of said coupling means plus the signal-to-noise ratio required for reliable triggering of said first and second detectors.

5. The system according to claim 4 wherein:

said sweep generator is responsive to operation of said second indicating means in the second state for maintaining constant the frequency of the signal output of said local oscillator, said comparator comprises a first differential amplifier having first and second inputs receiving the signal outputs of said first and second detectors, respectively, and having an output, and said first indicating means comprises:

a first multivibrator having first and second inputs, second connecting means for connecting the first input of said first multivibrator to the output of said first differential amplifier, and third means for connecting the second input of said first multivibrator for receiving a signal output of said second indicating means, said first multivibrator being responsive to operation of said second indicating means in the first state for operating in a first state and being unrepsonsive to the signal output of said first differential amplifier, and being responsive to operation of said second indicating means in the second state for being responsive to the signal output of said first differential amplifier for operating in the first state for indicating that intermediate frequency signals in the signal outputs of said mixers are caused by an undesired received signal in the input signal when the magnitude of the signal output of said first differential amplifier is a voltage ratio which is less than the coupling factor of said coupling means plus the signal-to-noise ratio required for reliable triggering of said first and second detectors, and for operating in a second state for indicating that the intermediate frequency signals in the signal outputs of said mixers are caused by a desired received signal in the input signal when the magnitude of the signal output of said first differential amplifier is a voltage ratio which is greater than the coupling factor of said coupling means plus the signal-to-noise raito required for reliable triggering of said first and second detectors.

6. The system according to claim 5 including:

a first source of reference voltage having an output, said first differential amplifier having a third input connected to the output of said first source of reference voltage.

7. The system according to claim 5 wherein said first indicating means includes:

a second source of reference voltage having an output, said second connecting means comprising:

a second differential amplifier having a first input connected to the output of said first differential amplifier, having a second input connected to the output of said second source of reference voltage, and having an output connected to the first input of said first multivibrator, operation of said first multivibrator being controlled by the signal output of said second differential amplifier during operation of said second indicating means in the second state.

8. The receiver system according to claim 1 wherein said system is a direction finding system which operates in a search mode for locating a received signal, in an identification mode for determining whether intermediate frequency signals in the mixer outputs are produced by desired or undesired received signals, and in a direction finding mode for determining the direction of the source of received signals, said direction finding system including:

first and second antennas having a boresight axis and being adapted to receive incident signals, a beam-forming network for combining the antenna signal outputs for providing a first signal output which is the sum thereof and a second signal output which is the difference thereof, said first connecting means comprising a switch having a first input connected to the second output of said coupling means, having a second input receiving the second difference signal output of said network, having a third input receiving a signal output of said first indicating means, and having an output connected to the first input of said second mixer, a sweep generator producing a sweep signal, said oscillator being responsive to the sweep signal from said geneartor for producing a local oscillator signal which has a frequency that varies according to the sweep signal, means responsive to signals which are proportional to components in the signal outputs of said mixers which have frequencies equal to the prescribed intermediate frequency for producing an output signal which indicates the sense of received signals and whether a source of received signals is to the right or left of the boresight axis, second indicating means responsive to a signal output of said ratio means for operating in a first state when the system is in the search mode and in a second state in the identification and direction finding modes for indicating that a received signal is determined to be present in the input signal when the magnitude of the signal output of said ratio means is greater than the coupling factor of said coupling means plus the signal-to-noise ratio required for reliable operation of the system, said sweep generator being responsive to operation of said second indicating means in the second state for biasing said oscillator for maintaining constant the frequency of the local oscillator signal, and said first indicating means comprising a spurious signal identifier responsive to operation of said second indicating means in the first state during the search mode for operating in a first state and responsive to operation of said second indicating means in the second state in the identification mode for being responsive to the output of said ratio means and operating in the first state for indicating that intermediate frequency signals in the mixer signal outputs are caused by an undesired received signal in the input signal when the magnitude of the signal output of said ratio means is a voltage ratio which is greater than the coupling factor of said coupling means plus the signal-to-noise ratio required for reliable operation of the system, and for operating in a second state for indicating that intermediate frequency signals in the mixer signal outputs are caused by a desired received signal in the input signal when the magnitude of the signal output of said ratio means is a voltage ratio which is greater than the coupling factor of said coupling means plus the signal-to-noise ratio required for reliable operation of the system, said second indicating means being responsive to operation of said identifier in the second state for continuing to operate in the second state, said switch being responsive to operation of said identifier in the first state for connecting the second output of said coupling means to said second mixer during operation in the search and identification modes, and responsive to operation of said identifier in the second state for connecting the second-difference signal output of said network to said second mixer during operating in the direction finding mode, an analyzer responsive to operation of said second indicating means in the second state for operating in the direction finding mode for analyzing the signal outputs of said sense determining means and said ratio means for producing a signal output proportional to the position of the source of received signal, and utilization means responsive to the signal output of said analyzer.

9. The system according to claim 8 wherein:

said ratio means comprises:

first and second logarithmic amplifiers responsive to the component of the mixer signal outputs of said first and second mixers, respectively, which have a frequency equal to the intermediate frequency for producing an output signal which is the logarithm thereof, first and second detectors responsive to the signal outputs of said first and second amplifiers, respectively, for producing output signals proportional to the magnitudes thereof, a comparator responsive to the signal outputs of said detectors for producing an output signal which is proportional to the ratio thereof, and said sense determining means comprises:

first and second limiters responsive to the signal outputs of said first and second log amplifiers, respectively, for controlling the maximum amplitudes thereof, and a phase detector responsive to the signal outputs of said limiters for operating in a first and a second state when the source of received signals is to the left and right, respectively, of the boresight axis, said signal-to-noise ratio, required for reliable operation of the system being equal to the signal-to-noise ratio required for reliable triggering of said first and second detectors.

10. The direction finding system according to claim 9 wherein:

said comparator comprises a first differential amplifier having first and second inputs receiving the signal outputs of said first and second detectors, respectively, and having an output, and said spurious signal identifier comprises:

a first multivibrator having an input, and second connecting means connecting the output of said first differential amplifier to the input of said first multivibrator.

11. The direction finding system according to claim 10 including:

a first source of reference voltage having an output, said first differential amplifier having a third input connected to the output of said first source of reference voltage.

12. The direction finding system according to claim 10 including:

a second source of reference voltage having an output, said second connecting means comprising:

a second differential amplifier having a first input connected to the output of said first differential amplifier, having a second input connected to the output of said second voltage source, and having an output connected to the input of said first multivibrator.

References Cited

UNITED STATES PATENTS

| | | | |
|---|---|---|---|
| 2,279,177 | 4/1942 | Plebansky | 325—435 |
| 2,964,622 | 12/1960 | Fire | 325—435 X |

RODNEY D. BENNETT, *Primary Examiner.*

RICHARD E. BERGER, *Assistant Examiner.*